(12) United States Patent
Jia

(10) Patent No.: US 8,838,680 B1
(45) Date of Patent: Sep. 16, 2014

(54) BUFFER OBJECTS FOR WEB-BASED CONFIGURABLE PIPELINE MEDIA PROCESSING

(75) Inventor: Wei Jia, San Jose, CA (US)

(73) Assignee: Google Inc., Mountain View, CA (US)

( * ) Notice: Subject to any disclaimer, the term of this patent is extended or adjusted under 35 U.S.C. 154(b) by 569 days.

(21) Appl. No.: 13/206,986

(22) Filed: Aug. 10, 2011

Related U.S. Application Data

(60) Provisional application No. 61/440,825, filed on Feb. 8, 2011.

(51) Int. Cl.
*G06F 15/16* (2006.01)

(52) U.S. Cl.
USPC .......................................................... 709/203

(58) Field of Classification Search
CPC .......... H04N 21/4431; H04N 21/4143; H04N 21/835; H04N 21/8193; H04N 21/818; H04N 21/4325; G06F 17/30056; G06F 17/30058
USPC ................................... 709/203, 212; 711/154
See application file for complete search history.

(56) References Cited

U.S. PATENT DOCUMENTS

| | | | |
|---|---|---|---|
| 5,473,326 A | 12/1995 | Harrington et al. | |
| 5,589,945 A | 12/1996 | Abecassis | |
| 5,606,371 A | 2/1997 | Klein Gunnewiek et al. | |
| 5,659,539 A | 8/1997 | Porter et al. | |
| 5,696,869 A | 12/1997 | Abecassis | |
| 5,793,647 A | 8/1998 | Hageniers et al. | |
| 5,828,370 A | 10/1998 | Moeller et al. | |
| 5,903,264 A | 5/1999 | Moeller et al. | |
| 5,910,827 A | 6/1999 | Kwan et al. | |
| 5,913,038 A | 6/1999 | Griffiths | |
| 5,930,493 A | 7/1999 | Ottesen et al. | |
| 5,943,065 A | 8/1999 | Yassaie et al. | |
| 5,963,203 A | 10/1999 | Goldberg et al. | |
| 6,011,824 A | 1/2000 | Oikawa et al. | |

(Continued)

FOREIGN PATENT DOCUMENTS

| | | |
|---|---|---|
| EP | 1947680 | 7/2008 |
| JP | 2008225379 | 9/2008 |

(Continued)

OTHER PUBLICATIONS

U.S. Appl. No. 13/206,991, filed Aug. 10, 2011.

(Continued)

*Primary Examiner* — David X Yi
(74) *Attorney, Agent, or Firm* — Young, Basile, Hanlon & MacFarlane, P.C.

(57) ABSTRACT

An apparatus and method relating to buffer objects for web-based media processing are disclosed. The disclosed embodiments include a web browser implemented on a computing device. The web browser includes a web application processor for processing a web application that includes instructions to process a media stream using one or more configurable pipelines, each configurable pipeline including a plurality of components connected by data channels using buffer objects, the buffer objects including a data pointer identifying a location in a memory, the data pointer having an associated data size representing an amount of memory available at the memory location, an allocation method configured to allocate memory to the buffer object using the data pointer and the data size, and an accessor method configured to enable a component in the configurable pipeline to access data stored in the memory identified by the data pointer and the data size.

19 Claims, 9 Drawing Sheets

(56) References Cited

U.S. PATENT DOCUMENTS

| | | | |
|---|---|---|---|
| 6,014,706 A | 1/2000 | Cannon et al. |
| 6,038,367 A | 3/2000 | Abecassis |
| 6,047,255 A | 4/2000 | Williamson |
| 6,052,159 A | 4/2000 | Ishii et al. |
| 6,061,821 A | 5/2000 | Schlosser |
| 6,112,234 A | 8/2000 | Leiper |
| 6,119,154 A | 9/2000 | Weaver et al. |
| 6,134,352 A | 10/2000 | Radha et al. |
| 6,185,363 B1 | 2/2001 | Dimitrova et al. |
| 6,253,249 B1 | 6/2001 | Belzile |
| 6,266,337 B1 | 7/2001 | Marco |
| 6,404,817 B1 | 6/2002 | Saha et al. |
| 6,452,950 B1 | 9/2002 | Ohlsson et al. |
| 6,453,283 B1 | 9/2002 | Gigi |
| 6,510,219 B1 | 1/2003 | Wellard et al. |
| 6,512,795 B1 | 1/2003 | Zhang et al. |
| 6,587,985 B1 | 7/2003 | Fukushima et al. |
| 6,590,902 B1 | 7/2003 | Suzuki et al. |
| 6,597,812 B1 | 7/2003 | Fallon et al. |
| 6,636,561 B1 | 10/2003 | Hudson |
| 6,665,317 B1 | 12/2003 | Scott |
| 6,683,889 B1 | 1/2004 | Shaffer et al. |
| 6,684,354 B2 | 1/2004 | Fukushima et al. |
| 6,700,893 B1 | 3/2004 | Radha et al. |
| 6,707,852 B1 | 3/2004 | Wang |
| 6,721,327 B1 | 4/2004 | Ekudden et al. |
| 6,732,313 B2 | 5/2004 | Fukushima et al. |
| 6,747,999 B1 | 6/2004 | Grosberg et al. |
| 6,778,553 B1 | 8/2004 | Chou |
| 6,792,047 B1 | 9/2004 | Bixby et al. |
| 6,859,460 B1 | 2/2005 | Chen |
| 6,885,986 B1 | 4/2005 | Gigi |
| 6,918,077 B2 | 7/2005 | Fukushima et al. |
| 6,934,258 B1 | 8/2005 | Smith et al. |
| 7,003,039 B2 | 2/2006 | Zakhor et al. |
| 7,068,710 B2 | 6/2006 | Lobo et al. |
| 7,092,441 B1 | 8/2006 | Hui et al. |
| 7,096,481 B1 | 8/2006 | Forecast et al. |
| 7,124,333 B2 | 10/2006 | Fukushima et al. |
| 7,180,896 B1 | 2/2007 | Okumura |
| 7,180,901 B2 | 2/2007 | Chang et al. |
| 7,263,644 B2 | 8/2007 | Park et al. |
| 7,271,747 B2 | 9/2007 | Baraniuk et al. |
| 7,295,137 B2 | 11/2007 | Liu et al. |
| 7,356,750 B2 | 4/2008 | Fukushima et al. |
| 7,372,834 B2 | 5/2008 | Kim et al. |
| 7,376,880 B2 | 5/2008 | Ichiki et al. |
| 7,379,068 B2 | 5/2008 | Radke |
| 7,406,501 B2 | 7/2008 | Szeto et al. |
| 7,447,235 B2 | 11/2008 | Luby et al. |
| 7,447,969 B2 | 11/2008 | Park et al. |
| 7,484,157 B2 | 1/2009 | Park et al. |
| 7,502,818 B2 | 3/2009 | Kohno et al. |
| 7,567,671 B2 | 7/2009 | Gupte |
| 7,607,157 B1 | 10/2009 | Inoue et al. |
| 7,636,298 B2 | 12/2009 | Miura et al. |
| 7,680,076 B2 | 3/2010 | Michel et al. |
| 7,707,224 B2 | 4/2010 | Chastagnol et al. |
| 7,719,579 B2 | 5/2010 | Fishman et al. |
| 7,720,686 B2 | 5/2010 | Volk et al. |
| 7,756,127 B2 | 7/2010 | Nagai et al. |
| 7,823,039 B2 | 10/2010 | Park et al. |
| 7,886,071 B2 | 2/2011 | Tomita |
| RE42,272 E | 4/2011 | Zakhor et al. |
| 7,974,243 B2 | 7/2011 | Nagata et al. |
| 8,050,446 B2 | 11/2011 | Kountchev et al. |
| 8,098,957 B2 | 1/2012 | Hwang et al. |
| 8,102,399 B2 | 1/2012 | Berman et al. |
| 8,139,642 B2 | 3/2012 | Vilei et al. |
| 8,326,061 B2 | 12/2012 | Massimino |
| 8,352,737 B2 | 1/2013 | Solis et al. |
| 8,462,654 B1 | 6/2013 | Gieger et al. |
| 8,542,265 B1 | 9/2013 | Dodd et al. |
| 2002/0034245 A1 | 3/2002 | Sethuraman et al. |
| 2002/0099840 A1 | 7/2002 | Miller et al. |
| 2002/0140851 A1 | 10/2002 | Laksono |
| 2002/0157058 A1 | 10/2002 | Ariel et al. |
| 2002/0159525 A1 | 10/2002 | Jeong |
| 2002/0167911 A1 | 11/2002 | Hickey |
| 2003/0018647 A1 | 1/2003 | Bialkowski |
| 2003/0058943 A1 | 3/2003 | Zakhor et al. |
| 2003/0098992 A1 | 5/2003 | Park et al. |
| 2003/0103681 A1 | 6/2003 | Guleryuz |
| 2003/0193486 A1 | 10/2003 | Estrop |
| 2003/0210338 A1 | 11/2003 | Matsuoka et al. |
| 2003/0226094 A1 | 12/2003 | Fukushima et al. |
| 2004/0017490 A1 | 1/2004 | Lin |
| 2004/0146113 A1 | 7/2004 | Valente |
| 2004/0165585 A1 | 8/2004 | Imura et al. |
| 2005/0024384 A1 | 2/2005 | Evans et al. |
| 2005/0060229 A1 | 3/2005 | Riedl et al. |
| 2005/0060742 A1 | 3/2005 | Riedl et al. |
| 2005/0060745 A1 | 3/2005 | Riedl et al. |
| 2005/0063586 A1 | 3/2005 | Munsil et al. |
| 2005/0091508 A1 | 4/2005 | Lee et al. |
| 2005/0104979 A1 | 5/2005 | Fukuoka et al. |
| 2005/0111557 A1 | 5/2005 | Kong et al. |
| 2005/0154965 A1 | 7/2005 | Ichiki et al. |
| 2005/0180415 A1 | 8/2005 | Cheung et al. |
| 2005/0220444 A1 | 10/2005 | Ohkita et al. |
| 2005/0259690 A1 | 11/2005 | Garudadri et al. |
| 2005/0281204 A1 | 12/2005 | Karol et al. |
| 2006/0150055 A1 | 7/2006 | Quinard et al. |
| 2006/0164437 A1 | 7/2006 | Kuno |
| 2006/0195864 A1 | 8/2006 | New et al. |
| 2006/0200733 A1 | 9/2006 | Stankovic et al. |
| 2006/0256232 A1 | 11/2006 | Noguchi |
| 2006/0268124 A1 | 11/2006 | Fishman et al. |
| 2007/0124762 A1 | 5/2007 | Chickering et al. |
| 2007/0168824 A1 | 7/2007 | Fukushima et al. |
| 2007/0189164 A1 | 8/2007 | Smith et al. |
| 2007/0230585 A1 | 10/2007 | Kim et al. |
| 2007/0233707 A1 | 10/2007 | Osmond et al. |
| 2007/0255758 A1 | 11/2007 | Zheng et al. |
| 2007/0269115 A1 | 11/2007 | Wang et al. |
| 2008/0004731 A1 | 1/2008 | Ozaki |
| 2008/0005201 A1 | 1/2008 | Ting et al. |
| 2008/0008239 A1 | 1/2008 | Song |
| 2008/0046249 A1 | 2/2008 | Thyssen et al. |
| 2008/0052630 A1 | 2/2008 | Rosenbaum et al. |
| 2008/0055428 A1 | 3/2008 | Safai |
| 2008/0065633 A1 | 3/2008 | Luo et al. |
| 2008/0077264 A1 | 3/2008 | Irvin et al. |
| 2008/0101403 A1 | 5/2008 | Michel et al. |
| 2008/0109369 A1 | 5/2008 | Su et al. |
| 2008/0124041 A1 | 5/2008 | Nielsen et al. |
| 2008/0130756 A1 | 6/2008 | Sekiguchi et al. |
| 2008/0170793 A1 | 7/2008 | Yamada et al. |
| 2008/0178211 A1 | 7/2008 | Lillo et al. |
| 2008/0207182 A1 | 8/2008 | Maharajh et al. |
| 2008/0209300 A1 | 8/2008 | Fukushima et al. |
| 2008/0211931 A1 | 9/2008 | Fujisawa et al. |
| 2008/0225735 A1 | 9/2008 | Qiu et al. |
| 2008/0291209 A1 | 11/2008 | Sureka et al. |
| 2008/0320512 A1 | 12/2008 | Knight |
| 2009/0007159 A1* | 1/2009 | Rangarajan et al. .......... 719/328 |
| 2009/0052543 A1 | 2/2009 | Wu et al. |
| 2009/0073168 A1 | 3/2009 | Jiao et al. |
| 2009/0103606 A1 | 4/2009 | Lu et al. |
| 2009/0110055 A1 | 4/2009 | Suneya |
| 2009/0164655 A1 | 6/2009 | Pettersson et al. |
| 2009/0172116 A1 | 7/2009 | Zimmet et al. |
| 2009/0213940 A1 | 8/2009 | Steinbach et al. |
| 2009/0219994 A1 | 9/2009 | Tu et al. |
| 2009/0249158 A1 | 10/2009 | Noh et al. |
| 2009/0271814 A1 | 10/2009 | Bosscha |
| 2009/0284650 A1 | 11/2009 | Yu et al. |
| 2009/0307227 A1 | 12/2009 | Prestenback et al. |
| 2010/0111489 A1 | 5/2010 | Presler |
| 2010/0150441 A1 | 6/2010 | Evans et al. |
| 2010/0186041 A1 | 7/2010 | Chu et al. |
| 2010/0235820 A1* | 9/2010 | Khouzam et al. ............. 717/148 |
| 2011/0047163 A1 | 2/2011 | Chechik et al. |
| 2011/0078532 A1 | 3/2011 | Vonog et al. |

(56) References Cited

U.S. PATENT DOCUMENTS

| | | | |
|---|---|---|---|
| 2011/0122036 | A1 | 5/2011 | Leung et al. |
| 2011/0191374 | A1 | 8/2011 | Bengio et al. |
| 2012/0002080 | A1 | 1/2012 | Sasaki |
| 2012/0252679 | A1 | 10/2012 | Holcomb |
| 2012/0262603 | A1 | 10/2012 | Chen et al. |
| 2012/0314102 | A1 | 12/2012 | Wang |
| 2013/0039410 | A1 | 2/2013 | Tan et al. |
| 2013/0182130 | A1 | 7/2013 | Tran |

FOREIGN PATENT DOCUMENTS

| | | |
|---|---|---|
| WO | WO9611457 | 4/1996 |
| WO | WO9949664 | 9/1999 |
| WO | WO0233979 | 4/2002 |
| WO | WO02062072 | 8/2002 |
| WO | WO02067590 | 8/2002 |
| WO | WO02078327 | 10/2002 |
| WO | WO03043342 | 5/2003 |
| WO | WO2007057850 | 5/2007 |

OTHER PUBLICATIONS

U.S. Appl. No. 13/206,973, filed Aug. 10, 2011.
U.S. Appl. No. 13/206,996, filed Aug. 10, 2011.
The Khronos Group Inc. OpenMAX Integration Layer Application Programming Interface Specification. Version 1.12. Copyright, 2008.
Rosenberg, J. D. RTCWEB I-D with thoughts on the framework. Feb. 8, 2011. Retrieved from http://www.ietf.org/mail-archive/web/dispatch/current/msg03383.html on Aug. 1, 2011.
Rosenberg, J.D., et al. An Architectural Framework for Browser based Real-Time Communications (RTC) draft-rosenberg-rtcweb-framework-00. Feb. 8, 2011. Retrieved from http://www.ietf.org/id/draft-rosenberg-rtcweb-framework-00.txt on Aug. 1, 2011.
Al-Omari, Huthaifa, et al; "Avoiding Delay Jitter in Cyber-Physical Systems Using One Way Delay Variations Model", Computational Science and Engineering, 2009 International Conference, IEEE (Aug. 29, 2009) pp. 295-302.
Bagni, D.—A constant quality single pass vbr control for dvd recorders, IEEE, 2003, pp. 653-662.
Balachandran, et al., Sequence of Hashes Compression in Data De-duplication, Data Compression Conference, Mar. 2008, p. 505, issue 25-27, United States.
Bankoski et al. "Technical Overview of VP8, an Open Source Video Codec for the Web". Dated Jul. 11, 2011.
Bankoski et al. "VP8 Data Format and Decoding Guide" Independent Submission. RFC 6389, Dated Nov. 2011.
Bankoski et al. "VP8 Data Format and Decoding Guide; draft-bankoski-vp8-bitstream-02" Network Working Group. Internet-Draft, May 18, 2011, 288 pp.
Begen, Ali C., et al; "An Adaptive Media-Aware Retransmission Timeout Estimation Method for Low-Delay Packet Video", IEEE Transactions on Multimedia, vol. 9, No. 2 (Feb. 1, 2007) pp. 332-347.
Begen, Ali C., et al; "Proxy-assisted interactive-video services over networks wit large delays", Signal Processing: Image Communication, vol. 20, No. 8 (Sep. 1, 2005) pp. 755-772.
Cui, et al., Opportunistic Source Coding for Data Gathering in Wireless Sensor Networks, IEEE Int'l Conf. Mobile Ad Hoc & Sensor Systems, Oct. 2007, http://caltechcstr.library.caltech.edu/569/01 HoCuiCodingWirelessSensorNetworks.pdf, United States.
David Slepian and Jack K. Wolf, Noiseless Coding of Correlated Information Sources, IEEE Transactions on Information Theory; Jul. 1973; pp. 471-480; vol. 19, United States.
Digital Video Processing, Prentice Hall Signal Processing Series, Chapter 6: Block Based Methods.
Extended European Search Report EP09171120, dated Aug. 2, 2010.
Feng, Wu-chi; Rexford, Jennifer; "A Comparison of Bandwidth Smoothing Techniques for the Transmission of Prerecorded Compressed Video", Paper, 1992, 22 pages.
Friedman, et al., "RTP: Control Protocol Extended Reports (RTPC XR)," Network Working Group RFC 3611 (The Internet Society 2003) (52 pp).
Fukunaga, S. (ed.) et al., MPEG-4 Video Verification Model VM16, International Organisation for Standardisation ISO/IEC JTC1/SC29/WG11 N3312 Coding of Moving Pictures and Audio, Mar. 2000.
Ghanbari Mohammad, "Postprocessing of Late Calls for Packet Video", IEEE Transactions on Circuits and Systems for Video Technology, vol. 6, No. 6, Dec. 1996, 10 pages.
Gustafsson, F., Adaptive Filtering and Change Detection, John Wile & Sons, LTd, 2000.
He, Z. et al., A Linear Source Model and a Unified Rate Control Algorithm for DCT Video Coding, IEEE Transactions on Circuits and Systems for Video Technogy, Nov. 22, 2000.
Implementors' Guide; Series H: Audiovisual and Multimedia Systems; Coding of moving video: Implementors Guide for H.264: Advanced video coding for generic audiovisual services. H.264. International Telecommunication Union. Version 12. Dated Jul. 30, 2010.
Keesman, G.—Bit-rate control for MPEG encoders, Signal Processing Image communication 6 (1995) 545-560.
Laoutaris, Nikolaos, et al; "Intrastream Synchronization for Continuous Media Streams: A Survey of Playout Schedulers", IEEE Network, IEEE Service Center, vol. 16, No. 3 (May 1, 2002) pp. 30-40.
Li, A., "RTP Payload Format for Generic Forward Error Correction", Network Working Group, Standards Track, Dec. 2007, (45 pp).
Liang, Yi J., et al; "Adaptive Playout Scheduling Using Time-Scale Modification in Packet Voice Communications", 2001 IEEE International Conference on Acoustics, Speech, and Signal Processing, vol. 3 (May 7, 2001), pp. 1445-1448.
Liu, Haining, et al; "On the Adaptive Delay and Synchronization Control of Video Conferencing over the Internet", International Conference on Networking (ICN) (2004) 8 pp.
Liu, Hang, et al; "Delay and Synchronization Control Middleware to Support Real-Time Multimedia Services over Wireless PCS Networks", IEEE Journal on Selected Areas in Communications, IEEE Service Center, vol. 17, No. 9 (Sep. 1, 1999) pp. 1660-1672.
Multi-core processor, Wikipedia, the free encyclopedia. Http://wikipedia.org/wiki/Multi-core_processor; dated Apr. 30, 2012.
Nethercote, Nicholas, et al,; "How to Shadow Every Byte of Memory Used by a Program", Proceedings of the 3rd International Conference on Virtual Execution Environments, Jun. 13-15, 2007 San Diego CA, pp. 65-74.
Overview; VP7 Data Format and Decoder. Version 1.5. On2 Technologies, Inc. Dated Mar. 28, 2005.
Page, E. S., "Continuous Inspection Schemes"; Biometrika 4I; Statistical Laboratory, University of Cambridge, (1954); pp. 100-115.
Roca, Vincent, et al., Design and Evaluation of a Low Density Generator Matrix (LDGM) Large Block FEC Codec, INRIA Rhone-Alpes, Planete project, France, Date Unknown, (12 pp).
Schulzrinne, H., et al. RTP: A Transport Protocol for Real-Time Applications, RFC 3550. The Internet Society. Jul. 2003.
Sekiguchi S. et al.: "CE5: Results of Core Experiment on 4:4:4 Coding", JVT Meeting: Mar. 31, 2006-Jul. 4, 2006 Geneva, CH; (Joint Videoteam of ISO/IEC JTC1/SC29/WG11 and ITU-T Sg. 16), No. JVT-S014, Apr. 1, 2006 pp. 1-19.
Series H: Audiovisual and Multimedia Systems; Infrastructure of audiovisual services—Coding of moving video. H.264. Advanced video coding for generic audiovisual services. International Telecommunication Union. Version 11. Dated Mar. 2009.
Series H: Audiovisual and Multimedia Systems; Infrastructure of audiovisual services—Coding of moving video. H.264. Advanced video coding for generic audiovisual services. International Telecommunication Union. Version 12. Dated Mar. 2010.
Series H: Audiovisual and Multimedia Systems; Infrastructure of audiovisual services—Coding of moving video. H.264. Amendment 2: New profiles for professional applications. International Telecommunication Union. Dated Apr. 2007.
Series H: Audiovisual and Multimedia Systems; Infrastructure of audiovisual services—Coding of moving video. H.264. Advanced video coding for generic audiovisual services. Version 8. International Telecommunication Union. Dated Nov. 1, 2007.
Series H: Audiovisual and Multimedia Systems; Infrastructure of audiovisual services—Coding of moving video; Advanced video coding for generic audiovisual services. H.264. Amendment 1: Sup-

(56) References Cited

OTHER PUBLICATIONS port of additional colour spaces and removal of the High 4:4:4 Profile. International Telecommunication Union. Dated Jun. 2006.
Series H: Audiovisual and Multimedia Systems; Infrastructure of audiovisual services—Coding of moving video; Advanced video coding for generic audiovisual services. H.264. Version 1. International Telecommunication Union. Dated May 2003.
Series H: Audiovisual and Multimedia Systems; Infrastructure of audiovisual services—Coding of moving video; Advanced video coding for generic audiovisual services. H.264. Version 3. International Telecommunication Union. Dated Mar. 2005.
Sunil Kumar Liyang Xu, Mrinal K. Mandal, and Sethuraman Panchanathan, Error Resiliency Schemes in H.264/AVC Standard, Elsevier J. of Visual Communicatio & Image Representation (Special issue on Emerging H.264/AVC Video Coding Standard), vol. 17 (2), Apr. 2006.
Trista Pei-Chun Chen and Tsuhan Chen, Second-Generation Error Concealment for Video Transport Over Error Prone Channels, electrical computer Engineering, Carnegie Mellon University, Pittsburgh, PA 15213, U.S.A.
Tsai, et al., The Efficiency and Delay of Distributed Source Coding in Random Access Sensor Networks, 8th IEEE Wireless Communications and Networking Conference, Mar. 2007, pp. 786-791, United States.
Vasudev Bhaskaran et al., "Chapter 6: The MPEG Video Standards", Image and Video Compression Standards—Algorithms & Architectures, Second Edition, 1997, pp. 149-230 Kluwer Academic Publishers.
VP6 Bitstream & Decoder Specification. Version 1.02. On2 Technologies, Inc. Dated Aug. 17, 2006.
VP6 Bitstream & Decoder Specification. Version 1.03. On2 Technologies, Inc. Dated Oct. 29, 2007.
VP8 Data Format and Decoding Guide. WebM Project. Google On2. Dated: Dec. 1, 2010.
Wang, et al., Distributed Data Aggregation using Clustered Slepian-Wolf Coding in Wireless Sensor Networks, IEEE International Conference on Communications, Jun. 2007, pp. 3616-3622, United States.
Wang, Yao "Error Control and Concealment for Video Communication: A Review", Proceedings of the IEEE, vol. 86, No. 5, May 1998, 24 pages.
Wikipedia, the free encyclopedia, "Low-density parity-check code", http://en.wikipedia.org/wiki/Low-density_parity-check_code, Jul. 30, 2012 (5 pp).
Woo-Shik Kim et al: "Enhancements to RGB coding in H.264/MPEG-4 AVC. FRExt", Internet Citation, Apr. 16, 2005, XP002439981, Retrieved from the internet: URL:ftp3.itu.ch/av-arch/video-site/0504_Bus/VCEG-Z16.doc, retrieved on Jun. 28, 2007 p. 5.

\* cited by examiner

BUFFER OBJECTS FOR WEB-BASED CONFIGURABLE PIPELINE MEDIA PROCESSING

CROSS REFERENCE TO RELATED APPLICATIONS

This application claims priority to U.S. Provisional Patent Application Ser. No. 61/440,825, filed Feb. 8, 2011, which is incorporated herein in its entirety.

TECHNICAL FIELD

The present invention relates in general to web-based processing of media and in particular to buffer objects for web-based configurable pipeline media processing.

BACKGROUND

In the early stages of the World Wide Web (WWW), web pages generally consisted of static content (such as text and images) stored on servers. The static content was accessed and rendered by a web browser executing on a client. As the WWW has evolved, much content on the web is now dynamically generated. Such content can include web applications which that include instructions to be performed by the client web browsers. Such web applications can provide a more interactive and functional experience than earlier web pages. More recent web applications now include various forms of media, including audio and video content.

SUMMARY

Disclosed herein are embodiments of methods and apparatuses for buffer objects for web-based configurable pipeline media processing.

One aspect of the disclosed embodiments is a web browser implemented on a computing device. The web browser includes a web application processor for processing a web application that includes instructions to process a media stream using one or more configurable pipelines, each configurable pipeline including a plurality of components connected by data channels using buffer objects. At least some of the buffer objects include a data pointer identifying a location in a memory, the data pointer having an associated data size representing an amount of memory available at the memory location, an allocation method configured to allocate memory to the buffer object using the data pointer and the data size, and an accessor method configured to enable a component in the configurable pipeline to access data stored in the memory identified by the data pointer and the data size.

Another aspect of the disclosed embodiments is a buffer object configured for use in a configurable pipeline to pass data within data channels between a plurality of components in the configurable pipeline, the configurable pipeline created within a web browser and executed on a computing device. The buffer object includes a data type property, a data pointer identifying a location in a memory, the data pointer having an associated data size representing an amount of memory available at the memory location, an allocation method configured to allocate memory to the buffer object using the data pointer and the data size, and an accessor method configured to enable a component in the configurable pipeline to access data stored in the memory identified by the data pointer and the data size.

Another aspect of the disclosed embodiments is a method of transferring data with buffer objects between components in a configurable pipeline implemented using a web browser. The method includes initializing the configurable pipeline based on instructions included within a web application executed by the web browser, the initialization including creating data channels between components in the configurable pipeline, creating a plurality of buffer objects to enable the data channels to transfer data between the components of the configurable pipeline, storing data in a buffer object of the plurality of buffer objects by an output port of a first component, passing the buffer object from the first component to an input port of a second component by way of at least one of the data channels, and retrieving the data stored in the buffer object by the second component.

These and other embodiments will be described in additional detail hereafter.

BRIEF DESCRIPTION OF THE DRAWINGS

The description herein makes reference to the accompanying drawings wherein like reference numerals refer to like parts throughout the several views, and wherein.

DETAILED DESCRIPTION

Various solutions for including media in web applications include monolithic plugins, such as Adobe Flash and monolithic built-in browser functionality, such as the video tag included in HTML5. These solutions provide a web application high level control over a pre-defined process, such as video encoding or decoding, but do not provide customized or granular control over the process. Custom processes can require, for example, a distinct and custom programmed plugin module for the entire process. Thus, adding proprietary or other custom aspects to a process (such as Digital Rights Management (DRM), advertising overlays, video enhancements, etcetera) can be cumbersome, time-consuming, and costly. To the contrary, a modular configurable pipeline implemented in a web browser can enable a web application to configure custom processes and have granular control over those processes.

In particular, a modular configurable pipeline can be implemented using components and buffer objects. Components can be arranged within a configurable pipeline to perform processing tasks. Data channels can be established between the components to pass data through the configurable pipeline. Data can be passed through the data channels using buffer objects. Buffer objects can be utilized, for example, in a circular buffer technique or a pass through buffer technique.

Figure 1:
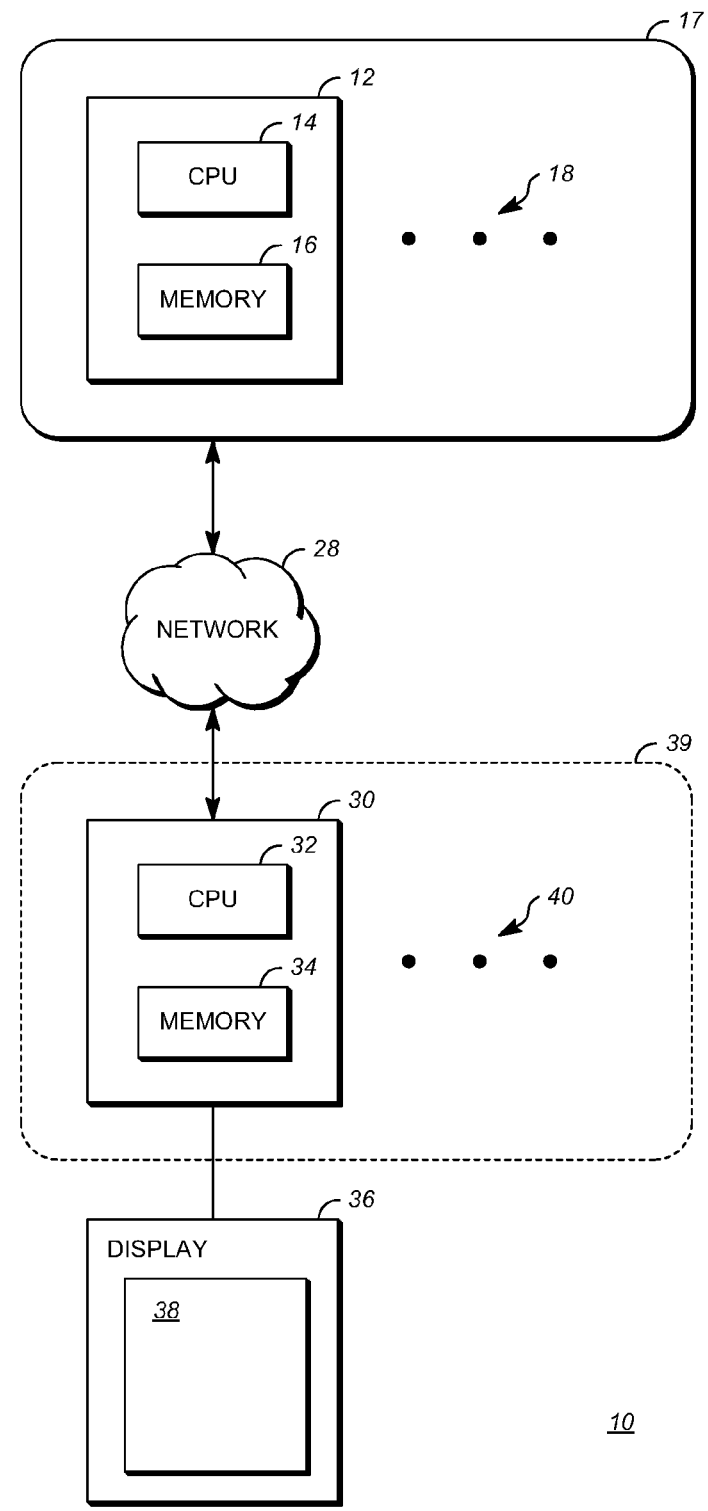
FIG. 1 is a diagram of a client-server computing scheme according to embodiments of the disclosed subject matter.

FIG. 1 is a diagram of a client-server system 10. Server 12 can be, for example, a computer having an internal configuration of hardware including a processor such as a central processing unit (CPU) 14 and a memory 16. CPU 14 can be a controller for controlling the operations of server 12. The CPU 14 is connected to memory 16 by, for example, a memory bus. Memory 16 can include random access memory (RAM) or any other suitable memory device. Memory 16 can store data and program instructions which are used by the CPU 14. Other suitable implementations of server 12 are possible.

The server 12 can be the only server or can be one of a group of servers 17 that includes additional servers 18. The group of servers 17 can be implemented as a computing cluster whereby the server 12 and additional servers 18 share resources, such as storage memory, and load-balance the processing of requests to the group of servers 17. The group of servers 17 can alternatively be a cloud computing service. For example, a cloud computing service can include hundreds or thousands of servers configured to provide scalable computing resources. In a cloud computing service, computing tasks can be performed on one or more servers or other computing devices included within the cloud computing service.

The above are only exemplary implementations of the group of servers 17, and any distributed computing model can be used in their place. As used herein and in the claims, the term "server" is understood to include any combination or implementation of servers, server groups, or any other configuration of computing devices of any kind.

A network 28 connects the servers in the group of servers 17 and a client 30 and any additional clients 40 in a group of clients 39. Network 28 is, for example, the Internet. Network 28 can also be a local area network (LAN), wide area network (WAN), virtual private network (VPN), or any other means of transferring data between the servers 17 and a group of clients 39.

The client 30, in one example, can be a desktop computer having an internal configuration of hardware including a processor such as a central processing unit (CPU) 32 and a memory 34. CPU 32 is a controller for controlling the operations of client 30. CPU 32 can be connected to memory 34 by, for example, a memory bus. Memory 34 may be RAM or any other suitable memory device. Memory 34 stores data and program instructions which are used by CPU 32. Other suitable implementations of client 30 are possible, including handheld computing devices, laptops, or mobile telephones.

A display 36 configured to display a graphical user interface can be connected to client 30. Display 36 may be implemented in various ways, including by a liquid crystal display (LCD) or a cathode-ray tube (CRT). The display 36 can be configured to display application windows including a web browser application window 38 on client 30.

Other implementations of the client-server system 10 are possible. For example, one implementation can omit the group of servers 17 and additional servers 18 and include only a single server 12. In another implementation, there may only be one client 30 instead of the group of clients 39 and additional clients 40. In another implementation, additional components may be added to the encoder and decoder system 10. For example, one or more peripherals, such as a video camera, can be attached to client 30 or some of the additional clients 40.

Figure 2:
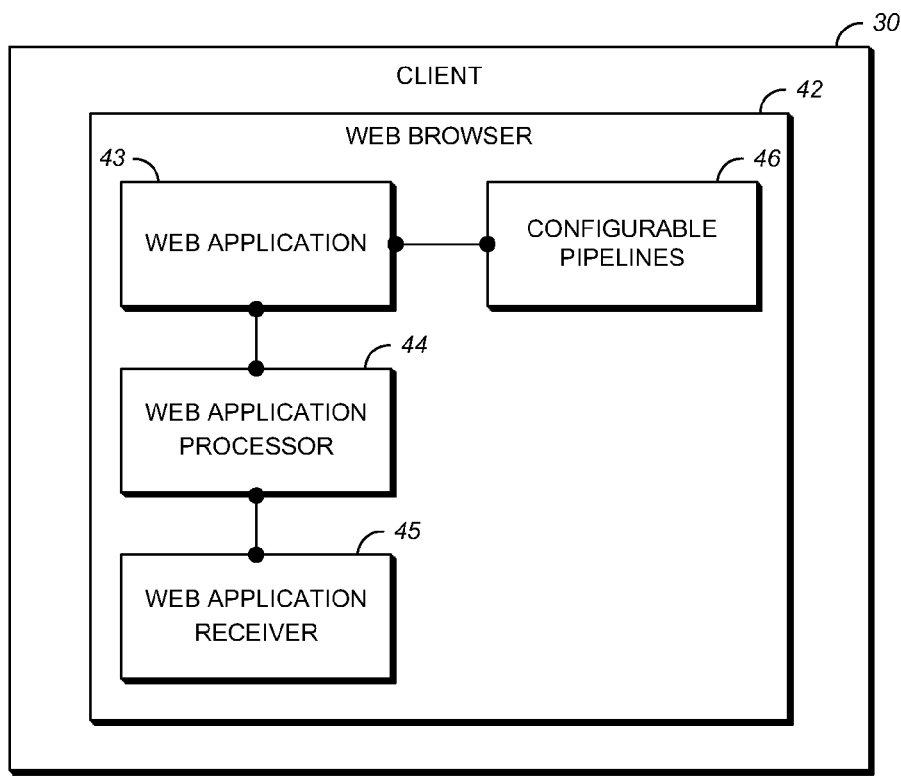
FIG. 2 is a block diagram of a web browser having configurable pipelines implemented within the client-server computing scheme of FIG. 1 according to embodiments of the disclosed subject matter.

FIG. 2 is a block diagram 41 of a web browser 42 having configurable pipelines 46 implemented within the client-server computing scheme of FIG. 1 according to embodiments of the disclosed subject matter. Web browser 42 is implemented on client 30. Web browser 42 can be in the form of computer executable instructions stored in memory 34 and executed by CPU 32. The web browser 42 includes web application 43, web application processor 44, web application receiver 45, and configurable pipelines 46. However, other alternative configurations of web browser 42 can be utilized.

Web application 43 represents a web page that includes content to be executed on client 30 by web browser 42. For example, such content can include scripting, such as JavaScript or ECMAScript. Alternatively, web application 43 can include other content such as Cascading Style Sheets (CSS) or other dynamic content. Web application 43 can be retrieved from a web server implemented on server 12 by way of web application receiver 45. Alternatively, web application 43 can be cached on client 30 and retrieved from client 30 instead of from server 12.

Web application processor 44 can be used to process instructions (such as script) included in web application 43. For example, a JavaScript engine can be included within web application processor 44 to interpret and execute script included in web application 43. Configurable pipelines 46 are used to process media streams by web browser 42. Configurable pipelines 46 can be initialized, configured, and controlled based on instructions (script) included in web application 43. For example, configurable pipelines 46 can be used to decode video and audio streams.

FIG. 2 is a conceptual block diagram depicting an exemplary configuration of a web browser 42 on client 30. Numerous alternative configurations are possible, including those that add to, remove from, and modify the blocks described above.

FIG. 3A-D are conceptual block diagrams of various exemplary pipeline configurations according to embodiments of the disclosed subject matter. One or more configurable pipelines can be created based on these decoder pipeline configurations. These pipeline configurations are for illustrative purposes only and numerous other configurations are possible, contemplated, and expected.

Figure 3A:
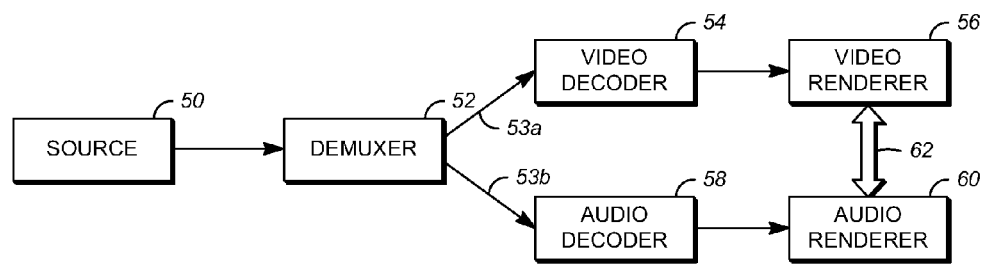
FIG. 3A-D are conceptual block diagrams of various exemplary pipeline configurations according to embodiments of the disclosed subject matter.

FIG. 3A depicts a basic configuration 48a. The basic configuration 48a includes a source 50, demuxer 52, video decoder 54, video renderer 56, audio decoder 58, audio renderer 60, and synchronization 62.

Source 50 is a source input that accepts a media stream. Source 50 can obtain the media stream directly based on a Uniform Resource Locator (URL) or other location provided by, for example, the web application 43. Alternatively, the media stream can be provided to source 50 by another component in web browser 42.

Demuxer 52 is configured to split a media stream into two streams. For example, demuxer 52 can take as input a combined video and audio stream. Demuxer 52 can take the individual video and audio streams and output them separately. In basic configuration 48a, demuxer 52 outputs the video stream as output 53a and the audio stream as output 53b.

Video decoder 54 is configured to decode the video stream output 53a. Video decoder 54 can be capable of decoding video streams encoded using one or more video encoding schemes. Video renderer 56 is configured to take the decoded video stream produced by video decoder 54 and render the decoded video stream to display 36 via, for example, web browser application window 38.

Audio decoder 58 is configured to decode the audio stream output 53b. Audio decoder 58 can be capable of decoding audio streams encoded using one or more audio encoding schemes. Audio renderer 60 is configured to take the decoded audio stream produced by audio decoder 58 and render the decoded audio stream to, for example, an audio card connected to client 30. The audio card can, for example, be connected to speakers or headphones to convert the rendered audio into sound waves. Alternative techniques for rendering audio to sound waves are available.

Synchronization 62 provides for the synchronization of rendering of the audio and video streams. In other words, synchronization 62 can ensure that video is rendered at the same time as the particular audio corresponding to the video so that, for example, a rendered video of a person speaking (i.e. lips moving) is synchronized with the rendered audio. Synchronization 62 can be accomplished using, for example, a clock component 220 as described in FIG. 7 below.

Figure 3B:
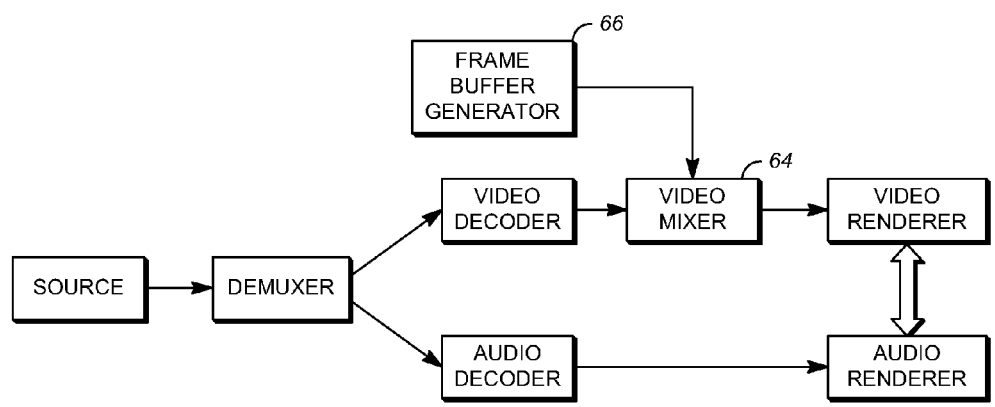

FIG. 3B depicts a mixer configuration 48b. The mixer configuration 48b includes the components of basic configuration 48a plus video mixer 64 and frame buffer generator 66. Video mixer 64 can be configured to combine video from video decoder 54 with images or video from frame buffer generator 66. For example, frame buffer generator 66 can be configured to generate images containing advertisements. Such images can then be overlaid using video mixer 64 such that the video from video decoder 54 is visible in areas where there is not an advertisement. In an alternative implementation, the video mixing can be performed using alpha-blending. In this case, the streams can be overlaid with the appearance of full or partial transparency. Other techniques of video mixing can also be used.

Figure 3C:
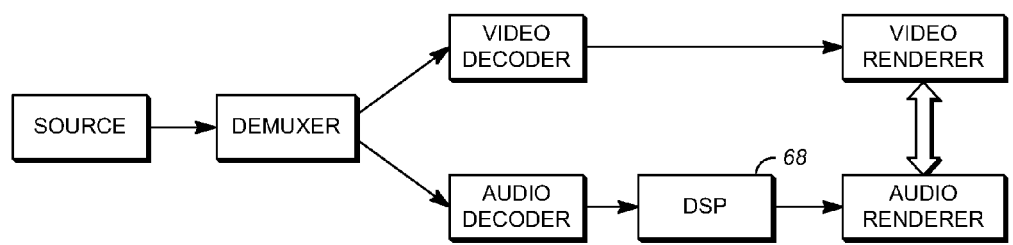

FIG. 3C depicts a post-processing configuration 48c. The post-processing configuration 48c includes the components of basic configuration 48a plus Digital Signal Processing (DSP) 68. DSP 68 can, for example, be configured to take an audio stream output by audio decoder 58 and enhance it by way of digital signal processing.

Figure 3D:
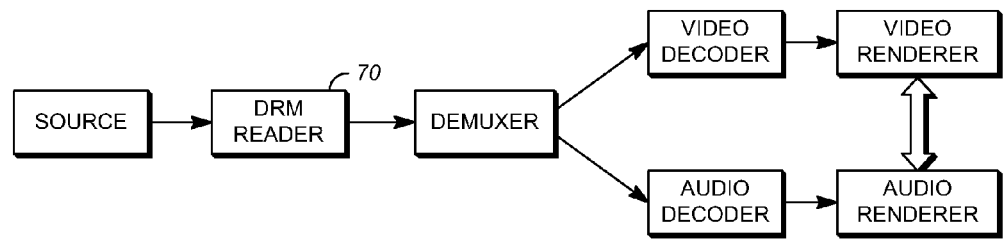

FIG. 3D depicts a digital rights management (DRM) configuration 48d. The DRM configuration 48d includes the components of basic configuration 48a plus DRM reader 70. DRM reader 70 can be configured to accept a media stream that is encoded or encrypted with a DRM scheme. DRM schemes are used to restrict media stream access based on, among other things, user licensing and rights. A component capable of processing one or more DRM schemes, such as DRM reader 70, is needed to read a media stream coded using DRM.

Figure 4A:
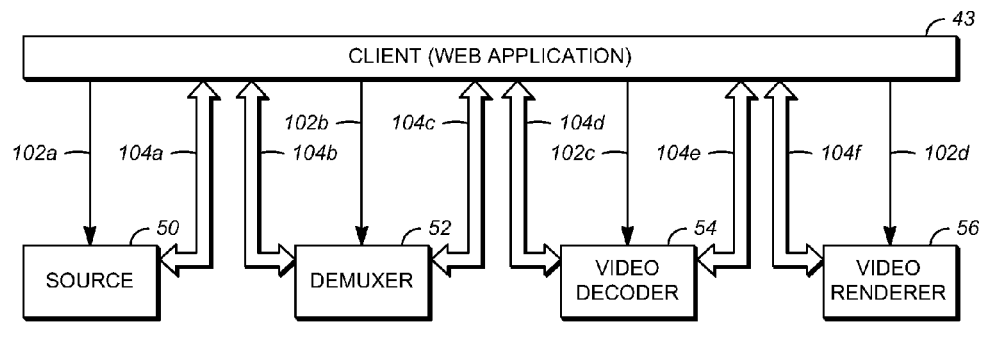
FIG. 4A is a block diagram of an exemplary configurable pipeline including built-in components according to embodiments of the disclosed subject matter.

FIG. 4A is a block diagram of an exemplary basic configurable pipeline 100a including built-in components according to embodiments of the disclosed subject matter. Basic pipeline 100a is controlled by web application 43 and includes source 50, demuxer 52, video decoder 54, and video renderer 56. Also included are control channels 102a-d and data channels 104a-f.

The control channels 102a-d are used to control pipeline 100a. For example, control channels 102a-d can access control functions of the source, components, and renderer of the pipeline to start, stop, pause, fast forward, etc., the processing of the media stream. Control channels 102a-d can include a JavaScript or other interpretive scripting language interface. For example, control channels 102a-d can be accessible by web application 43 via a JavaScript API. In one such implementation, control channels 102a-d are exposed via objects in a document object model (DOM) accessible by the web application 43. In pipeline 100a, control functions are performed individually for each element in the pipeline by web application 43 (i.e. sending a stop control signal to video renderer 56 will not automatically be conveyed to video decoder 54).

The data channels 104a-f are used to pass data between the elements (source, components and renderer) of pipeline 100a. For example, the incoming media stream is output by source 50 via data channel 104a to web application 43. Web application 43 then can pass the data from source 50 via data channel 104b to demuxer 52. In the pipeline configuration of pipeline 100a, the web application 43 passes data as described above between each element of the pipeline 100a.

The components shown in basic pipeline 100a can be implemented by the web browser 42 on client 30 as native binary components. Native binary components are included with web browser 42 and execute natively on the client 30 on which web browser 42 is implemented. In other words, a binary component can be written in a computer programming language such as C++, and then compiled to machine code that is executable natively on the client that is used to execute web browser 42.

Figure 4B:
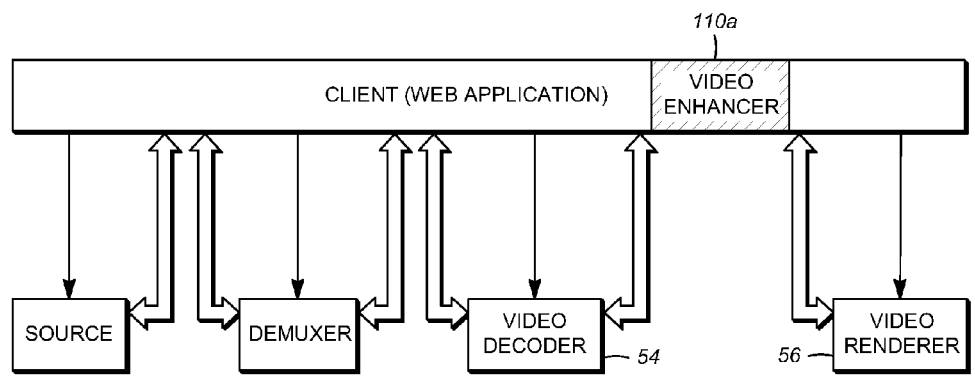
FIG. 4B is a block diagram of an exemplary configurable pipeline including built-in components and an interpretive add-in component according to embodiments of the disclosed subject matter.

FIG. 4B is a block diagram of an exemplary configurable decoder pipeline 100b including built-in components and an interpretive add-in component according to embodiments of the disclosed subject matter. Pipeline 100b includes the components of pipeline 100a, with the addition of video enhancer 110a. Video enhancer 110a is an interpretive add-in component included within web application 43. An interpretive add-in component is one implemented in an interpretive language, such as JavaScript instead of a native binary format. In this case, video enhancer 110a can be included in web application 43 to be used within pipeline 100b.

Web application 43 includes video enhancer 110a in the pipeline 100b by taking data from video decoder 54 via data channel 104e and passing that data to video enhancer 110a. Video enhancer 110a processes the data, and outputs data, which is then passed to video renderer 56 via data channel 104f. In this case, video enhancer 110a is shown, which is a component configured to enhance the decoded video. However, any type of component can be used within the pipeline 100b, including, for example, an advertising overlay component.

The structure of pipeline 100b provides web application 43 access to data input and output of each component in pipeline 100b as well as control of each component. This granular access to the processing pipeline allows great flexibility for a developer of web application 43 to include custom processing steps in, for example, a media stream decoding process.

Figure 4C:
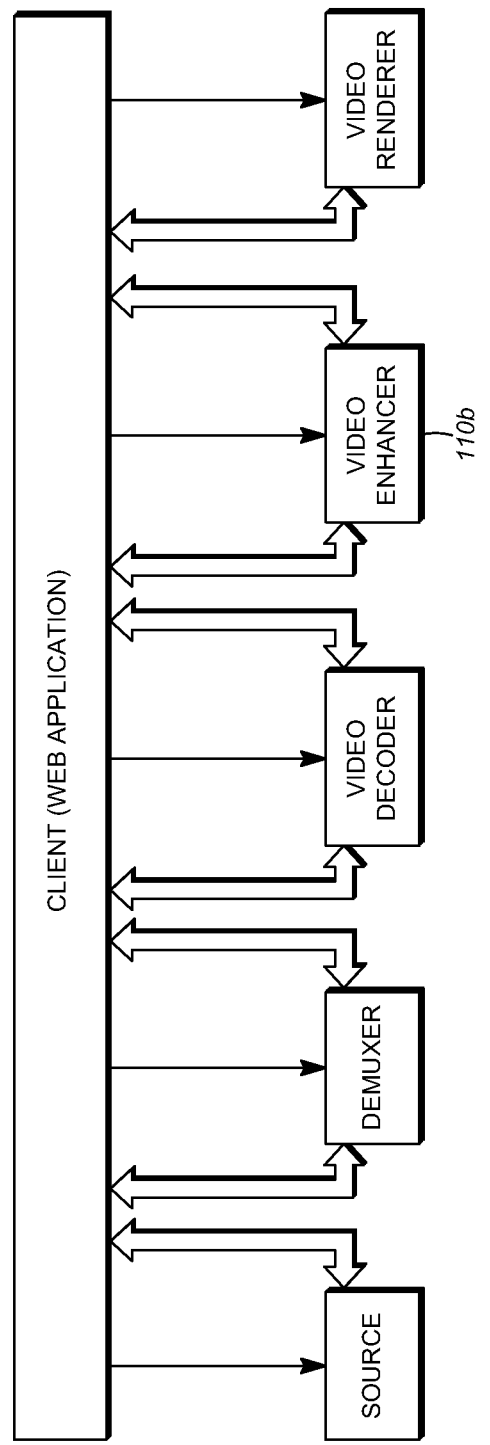
FIG. 4C is a block diagram of an exemplary configurable pipeline including built-in components and a binary add-in component according to embodiments of the disclosed subject matter.

FIG. 4C is a block diagram of an exemplary configurable decoder pipeline 100c including built-in components and a binary add-in component according to embodiments of the disclosed subject matter. Pipeline 100c is similar to pipeline 100b, with the exception of video enhancer 110b. Video enhancer 110b is implemented as a binary add-in component.

A binary add-in component is implemented as natively executable code, similar to native binary components. A binary add-in component can be more efficient than an interpretive component because it can execute natively on the client 30.

A binary add-in component can be stored on storage medium accessible via network 28, such as on server 12. The web browser 42 can retrieve the binary add-in component in response to instructions included in web application 43. The binary add-in component and interpretive add-in components can be structured in a common format and can be implemented using one or more standardized Application Programming Interfaces (APIs).

Binary and interpretive add-in components can be used by web application to dynamically change a configurable pipeline in some implementations. For example, video enhancer 110*a* or 110*b* could be added into a configurable pipeline for only part of a stream being processed. In another example, video mixer 64 can be added into the configurable pipeline for a certain time period to display advertisements, and then later be removed when the advertisements are no longer shown.

Alternatively, components can be swapped. For example, various implementations of video decoder 54 can be interchanged. A first implementation of video decoder 54 can be configured to decode a first video encoding scheme whereas a second implementation can be configured to decode a second video encoding scheme. The first implementation and second implementation can be interchanged dynamically if the encoding scheme of the stream being decoded changes, or if a new stream with a different encoding scheme is decoded using the configurable pipeline.

Figure 4D:
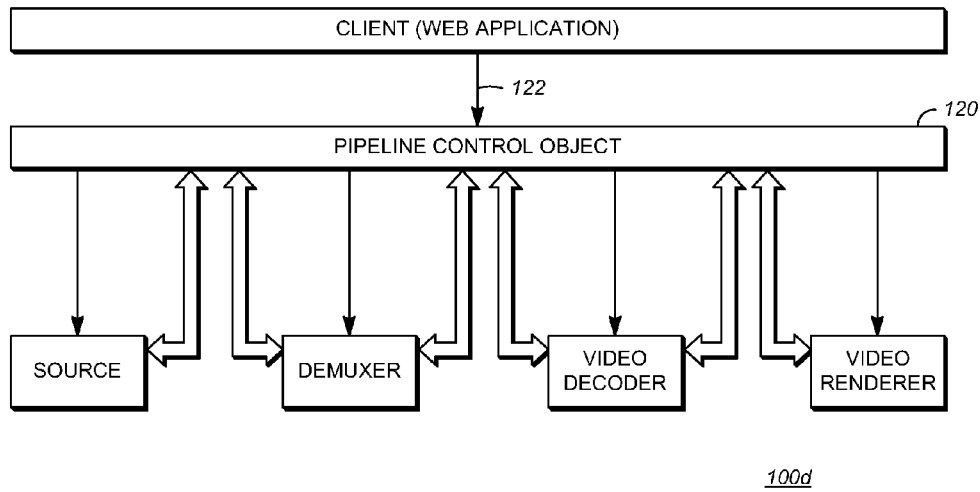
FIG. 4D is a block diagram of an exemplary configurable pipeline including a pipeline control object for controlling the configurable decoder pipeline according to embodiments of the disclosed subject matter.

FIG. 4D is a block diagram of an exemplary configurable pipeline 100*d* including a pipeline control object 120 for controlling the configurable pipeline 100*d* according to embodiments of the disclosed subject matter. The pipeline control object 120, which can also be referred to as a pipeline controller, removes granular control of pipeline 100*d* from the web application 43. Instead, web application 43 can utilize pipeline control channel 122 to control the entire pipeline 100*d*. The single point of control provided by pipeline control channel 122 can simplify the implementation of web application 43.

The pipeline control channel 122 can be configured to take simple commands from web application 43 and perform more complex control operations with respect to the components of pipeline 100*d*. In one implementation, pipeline control object 120 is configured with information including: a listing of all components in the configurable pipeline 100*d* including, for example, the order of components and the type of component; the data passing technique(s) in use; and the functionality of the pipeline (i.e. playback, encoding, etcetera).

Based on the configuration information, pipeline control object 120 can be configured to construct the configurable pipeline during initialization. For example, pipeline control object 120 can instantiate and configure each component and configure the data channels and buffer objects. Once the configurable pipeline is initialized, pipeline control channel 122 can accept commands to control the configurable pipeline.

In one example, pipeline control channel 122 can be configured to accept, for example, "play", "pause", and/or "seek" commands from web application 43. In the instance of "play", pipeline control object 120 can be configured to set each component in the configurable pipeline to the run state. Optionally, a start or other command can be sent to one or more components that require it. In the instance of "pause", pipeline control object 120 can be configured to set each component in the configurable pipeline to the paused state. In the instance of "seek", pipeline control object 120 can be configured to set each component in the configurable pipeline to the pause state, send control signals for each component to flush their input/output ports (i.e. return or deallocate remaining buffer objects), change the location in the stream at the component supplying the stream, and set each component to the run state. Optionally, a start or other command can be sent to one or more components that require it.

Pipeline control channel 122 allows the web application 43 to have a simpler interface to pipeline 100*d* while still allowing web application 43 to control and configure the components included in pipeline 100*d*. In one implementation the pipeline control object 120 can be implemented using a native binary module. Such an implementation can improve the efficiency of the pipeline control object 120 as compared to an implementation using, for example, JavaScript.

Figure 4E:
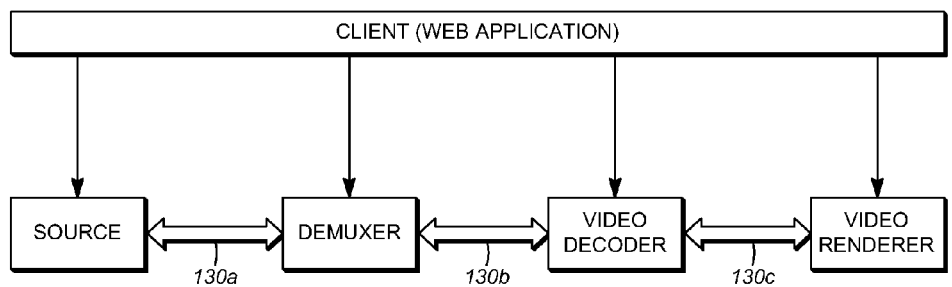
FIG. 4E is a block diagram of an exemplary configurable pipeline including data channels between components in the configurable decoder pipeline according to embodiments of the disclosed subject matter.

FIG. 4E is a block diagram of an exemplary configurable pipeline 100*e* including data channels between components in the configurable pipeline 100*e* according to embodiments of the disclosed subject matter. Pipeline 100*e* is similar to pipeline 100*a* with the exception that pipeline 100*e* includes provisions for passing data directly between source, components, and renderer. Data is passed via the data channels 130*a-c*.

Direct passing of data between elements in the pipeline 100*c* removes the overhead of having web application 43 pass data from data channel to data channel as is shown in pipeline 100*a*. Since web application 43 typically processes data using an interpreted scripting language, the improvement in performance by passing data directly between native binary components can be significant. Such an improvement in performance can be useful in applications such as real-time communications. However, the direct passing of data can, in some implementations, prevent the use of an interpretive add-in component. But some implementations may allow for a combination of direct passing of data between pipeline elements and also between pipeline elements and web application 43.

The passing of data via data channels as described with respect to FIGS. 4A-4E can be accomplished using buffer objects. Buffer objects are programming constructs that provide access to memory. Buffer objects can be viewed as a type of memory pointer within web browser 42. Buffer objects can be implemented so that they are accessible using JavaScript by way of the DOM of the web browser 42.

Buffer objects can include some or all of the following elements: data type, data pointer, data size, properties, allocation methods, and accessor methods. The data type of a buffer object indicates what is stored in the memory controlled by the buffer object. For example, data types can include: raw data, compressed stream, uncompressed audio, uncompressed video, etcetera. In some implementations, a buffer object may have a generic data type, wherein any type of data can be stored.

The data pointer can be a memory pointer that includes a memory address of where the buffer object's data is stored. In some implementations, a buffer object may have multiple data pointers. The buffer object also includes at least one data size, which indicates an amount of memory available to the buffer object with reference to the data pointer(s). For example, the data size may be a number of bytes of available memory.

Buffer object properties can be used to describe some aspect of what is stored in its memory. For example, a property of an audio stream can include its sampling rate. In another example, a property of a video stream can include its color space (i.e. RGB, YUV, etcetera). Available properties can be preset based on the data type. Alternatively or additionally, properties can be custom defined for some buffer object implementations.

Allocation methods are used to allocate memory within the buffer object. The allocation method can be called to allocate memory when the buffer object is created, though in some implementations, it can be called at a later time. In some implementations, memory can only be allocated for a buffer object once. However, in other implementations, the memory available in a buffer object can be changed using the allocation methods over time.

Various implementations of accessor methods can be used to access data stored in a buffer object's memory. Some implementations can allow for direct access to the buffer object memory. In this case, the accessor method would return a memory pointer to allow for direct access to memory. However, such an implementation could be platform dependent (i.e. require differing implementations for various operating systems). A more generic implementation could include copying the data stored in the buffer object to a temporary memory location made accessible outside of the buffer object.

Another implementation of accessor methods can include providing access to data on a less granular basis. In other words, data can be made available on a pixel, block, line, frame, or other level depending on the type of data stored by the buffer object. Alternatively, data can be provided as return values from accessor functions of the buffer object. While such accessor functions may provide a less efficient way to access the data, they would provide a more generic and less platform dependent means of accessing the data.

Figure 5:
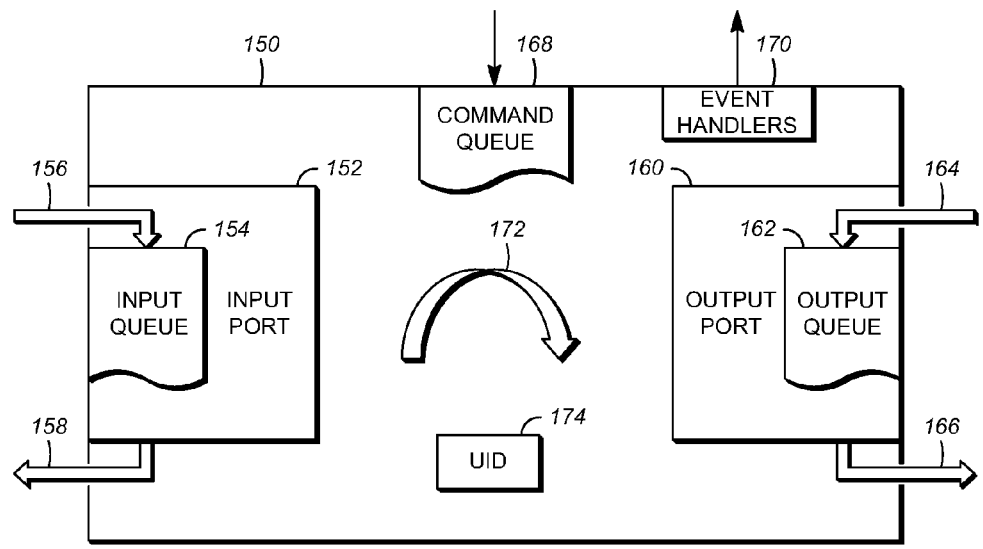
FIG. 5 is a block diagram of an exemplary component according to embodiments of the disclosed subject matter.

FIG. 5 is a block diagram of an exemplary component 150 according to embodiments of the disclosed subject matter. A component is the building block of the pipelines described herein. A component can include any type of processing that involves taking one or more inputs, processing those inputs, and then outputting the results of the processing to one or more outputs. Typically a component will have one input and one output as is shown by exemplary component 150. However in certain situations, it can be advantageous to have multiple inputs and/or multiple outputs. In one example, a demuxer can take a combined audio and video stream, split the audio and video components apart, and output each of the split components to separate outputs. Alternatively, a component can take two video inputs and combine or overlay those inputs into a single output. Either of the above examples can be modified to accommodate combined streams including three or more streams by increasing the number of input or output ports of the component. Depending on a component's purpose, in some implementations, the component can have only inputs (and no outputs) or only outputs (and no inputs).

Exemplary component 150 includes an input port 152. The input port 152 includes an input queue 154, input channel 156, and return channel 158. In one implementation, a circular buffer technique is used to pass data into component 150. The buffer technique includes passing buffer objects into the component via input channel 156. Input queue 154 is used to retrieve the contents of the memory referenced by the buffer objects. Once the contents are retrieved by component 150, the buffer object is returned via return channel 158 so that the memory referenced by the buffer object can be reused. Input port 152 can restrict the type of buffer objects accepted via input channel 156. For example, a video decoder component may only accept a buffer object containing compressed video data.

Exemplary component 150 also includes an output port 160. The output port 160 includes an output queue 162, return channel 164 and output channel 166. In one implementation, a circular buffer technique is used to pass data from component 150. The buffer technique includes passing buffer objects out of the component via output channel 166. The output queue 162 includes buffer objects that are used to store data output by component 150. The buffer objects are sent to the next element in the pipeline by way of output channel 166. Once the output data is retrieved from the buffer objects, they are returned to component 150 by way of return channel 164 so that they can be reused.

Component 150 can also include a command queue 168 and event handlers 170. Command queue 168 can be configured to accept commands for controlling component 150. For example, command queue 168 can include functionality to accept commands from web application 43 through the use of JavaScript code. Possible commands can include, for example, initializing or otherwise changing the state (described later with respect to FIG. 6) of component 150. A component can have attributes that are configurable by web application 43. For example, an audio encoder component can have attributes including encoding bit rate, codec type, and sampling frequency. In another example, a blurring component can have an attribute defining how much to blur the video passed into the component. Components can be controlled asynchronously or synchronously, depending on the implementation and the component.

Event handlers 170 can be configured to provide information to web application 43 of the current state of component 150 and any events occurring in component 150. For example, event handlers 170 can be configured to notify web application 43 when the state of component 150 changes. In another example, a component 150 implementing a decoder can be configured to notify web application 43 upon a change in resolution, frame rate, or color of the video stream being decoded.

The core of component 150 is its processing module 172. Processing module 172 is used to process data retrieved by input port 152 to be output by output port 160. Processing module 172 can include any process for transforming data. For example, processing module 172 can include a decoder, quality enhancer, discrete cosine transform (DCT), digital rights management (DRM) decoder, color filter, resolution scaler, or any other type of processing module. While a component typically will transform the input data to produce a different output data, some components may not change the input data. For example, a component may be configured to simply inspect the data for a particular condition or occurrence.

A component can have a unique identification code (UID) 174 to allow the component to be identified for instantiation by web application 43. UID 174 can be generated using a UID generation process, or may be issued by a centralized UID repository. However, in some implementations, a UID 174 may not be required if the component is, for example, provided by web application 43.

The implementation of component 150 described is exemplary only and alternative implementations are possible and expected. For example, input port 152 and output port 160 may utilize different techniques of memory management to receive and send data. For example, buffer objects may be passed through the component 150 (i.e. instead of returning the pointer via return channel 158, the pointers are used to output data via output channel 166). In such a technique, once at the end of the configurable pipeline, the buffer object's memory can be deallocated, or the buffer object may be passed back to the beginning of the configurable pipeline. Alternatively, some components may include different numbers of input and/or output ports. In some implementations, processing module 172 can include merely storing some or all of a stream to a device or accessing some or all of a stream from a device.

Figure 6:
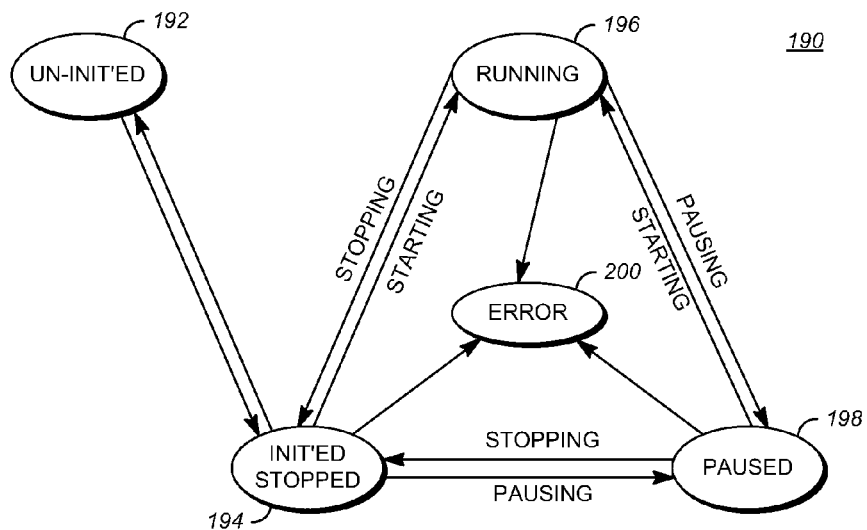
FIG. 6 is an exemplary state diagram relating to the operation of the exemplary component of FIG. 5 according to embodiments of the disclosed subject matter.

FIG. 6 is an exemplary state diagram 190 related to the operation of the exemplary component 150 of FIG. 5 according to embodiments of the disclosed subject matter. Uninitialized component 150 begins in an uninitialized state 192 upon execution. The state of component 150 transitions to initialized/stopped state 194 once the component is initialized. Initialization can include steps such as allocating memory to the input and output ports and initializing variables within component 150. In the initialized/stopped state 194, component 150 does not process, accept, or output data. Once in initialized/stopped state 194, component 150 can transition to any of running state 196, paused state 198, or error state 200.

When in running state 196, component 150 retrieves input data from input port 152, processes the data using processing module 172, and outputs the processed data using output port 160. When in paused state 198, component 150 accepts input data using input port 152, but does not process any of the input data. The component 150 can transition to error state 200 if there is a fatal error and the component is unable to continue to perform normally. When component 150 is in error state 200, web application 43 can be notified by way of, for example, event handlers 170.

The above state diagram 190 is illustrative of only one potential implementation of a component 150. Alternative implementations are possible, including those that add, remove, and modify the states illustrated in state diagram 190.

Figure 7:
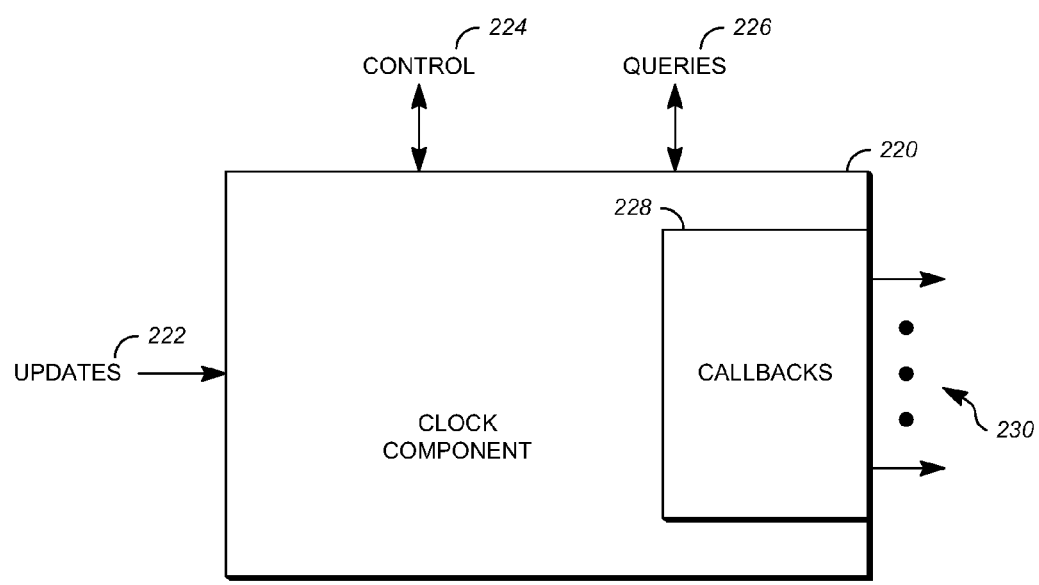
FIG. 7 is a block diagram of an exemplary clock component according to embodiments of the disclosed subject matter.

FIG. 7 is a block diagram of an exemplary clock component 220 according to embodiments of the disclosed subject matter. Clock component 220 provides generic functionality for synchronizing multiple output streams for playback. For example, clock component 220 can be utilized to synchronize the rendering of an output audio stream and an output video stream. In other words, clock component 220 is capable of synchronizing the outputs of various configurable pipelines. This functionality is important to the rendered streams, since the time needed to process and render the various streams through separate configurable pipelines may differ.

In one exemplary implementation, clock component 220 includes updates 222, control 224, queries 226, callback module 228, and callbacks 230. The stream of one configurable pipeline is designated a master stream. The master stream updates clock component 220 via updates 222 with its current media time (i.e. indicating the current location of rendering the stream) and other information that can vary from implementation to implementation. For example, in one implementation, the other information can include playback speed. In a typical implementation, the master stream passes this information to updates 222 on a specific periodic interval. Between the updates, clock component 220 can maintain synchronization using a system clock of client 30. The information can be determined and passed from a renderer component, such as audio renderer 60 for a master audio stream.

Other streams that are to be synchronized by clock component 220 are slave streams output by other configurable pipelines. The slave streams can query for the current media time and other information of the master stream from queries 226 so that the slave streams can synchronize with the master stream. For example, a renderer component, such as video renderer 56 can query information for a slave video stream from queries 226. Alternatively, a renderer component can set up one or more callbacks 230 using callbacks module 228. A callback is a technique whereby a synchronized component can stop processing or "sleep" and be triggered to continue processing by the callback when a particular media time or other condition is reached.

In other implementations, clock component 220 can be used to synchronize streams between components in the same configurable pipeline and before rendering. For example, clock component 220 could be used to synchronize the streams from frame buffer generator 66 and video decoder 54 with respect to mixer configuration 48b.

Clock component 220 can be implemented as a native binary component or as an interpretive add-in component. For example, clock component 220 can be included in web browser 42 as a native binary component to improve the efficiency and ease of use of clock component 220. However, clock component 220 can alternatively be implemented as an interpretive add-in component. Such an implementation permits the use of clock component 220, even when a particular web browser 42 does not natively include clock component 220.

Clock component 220 can be accessed and controlled from web application 43 via control 224 having a JavaScript code API accessible via a DOM interface. For example, the web application 43 can initialize, start, stop, or update the playback speed controlled by clock component 220. Clock component 220 can be controlled similarly to other components in the configurable pipeline(s) that it is a part of, including by web application 43 directly and using an intermediate pipeline control object 120.

The embodiments of server 12 and/or client 30 (and the algorithms, methods, instructions etc. stored thereon and/or executed thereby) can be realized in hardware including, for example, IP cores, ASICSs, programmable logic arrays, optical processors, programmable logic controllers, microcode, firmware, microcontrollers, servers, microprocessors, digital signal processors or any other suitable circuit. In the claims, the term "processor" should be understood as encompassing any the foregoing, either singly or in combination. The terms "signal" and "data" are used interchangeably. Further, portions of server 12 and client 30 do not necessarily have to be implemented in the same manner.

Further, in one example, server 12 or client 30 can be implemented using a general purpose computer/processor with a computer program that, when executed, carries out any of the respective methods, algorithms and/or instructions described herein. In addition or alternatively, for example, a special purpose computer/processor can be utilized which can contain specialized hardware for carrying out any of the methods, algorithms, or instructions described herein.

Server 12 and client 30 can, for example, be implemented on computers in a webmail system. Client 30 can be implemented on a device such as a hand-held communications device (i.e. a cell phone). In this instance, server 12 can exchange HTTP communications with the communications device. Other suitable server 12 and client 30 implementation schemes are available. For example, client 30 can be a personal computer rather than a portable communications device.

Implementations or portions of implementations of the above disclosures can take the form of a computer program product accessible from, for example, a computer-usable or computer-readable medium. A computer-usable or computer-readable medium can be any tangible device that can, for example, contain, store, communicate, or transport the program for use by or in connection with any processor. The medium can be, for example, an electronic, magnetic, optical, electromagnetic, or a semiconductor device. Other suitable mediums are also available. Such computer-usable or computer-readable media can be referred to as non-transitory media, and may include RAM or other volatile memory or storage devices that may change over time.

The exemplary approaches herein have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. An apparatus, comprising:
   a processor configured to execute instructions of a web application available from a web browser, the instructions including:
   instructions to process a media stream using one or more configurable pipelines, each configurable pipeline including a plurality of executable software components connected by data channels;
   instructions to pass each buffer object through at least one of the data channels to a component of the executable software components to permit processing the media stream and to return the buffer object from the component after processing, at least some of the buffer objects including:
      a data pointer identifying a location in a memory, the data pointer having an associated data size representing an amount of memory available at the memory location;
   allocation instructions to allocate memory to the buffer object using the data pointer and the data size; and
   accessor instructions to enable the component in the configurable pipeline to access data stored in the memory identified by the data pointer and the data size, at least some of the buffer objects further including:
   a data type property indicative of a type of data stored in the memory identified by the data pointer and the data size, the data type property usable by the component of the executable software components to restrict buffer objects accepted by the component to those having one or more specified data type properties.

2. The apparatus of claim 1, wherein at least some of the buffer objects are configured to be accessible using JavaScript code that is exposed using a Document Object Model interface in the web browser.

3. The apparatus of claim 1, wherein at least some of the buffer objects further include:
   a plurality of data type properties, each property representative of an aspect of the data stored in the memory identified by the data pointer and the data size.

4. The apparatus of claim 3, wherein the plurality of data type properties includes a property selected from the group of an audio sampling rate or a color of a video stream.

5. The apparatus of claim 1, wherein at least some of the buffer objects are used by a circular buffer technique in the configurable pipeline whereby data is stored in a buffer object by a first component, the buffer object is transferred to an input port of a second component via a data channel, the data is processed by the second component, and then the buffer object is returned to the first component to be reused.

6. The apparatus of claim 1, wherein at least some of the buffer objects are used by a pass through technique in the configurable pipeline whereby data is stored in a buffer object by a first component, the buffer object is transferred to an input port of a second component via a data channel, the data is processed by the second component, and then the buffer object is used by the second component to output processed data to a third component.

7. The apparatus of claim 1, wherein the data type property is one of: raw data, compressed stream, uncompressed stream, or generic.

8. The apparatus of claim 7, wherein the accessor instructions provide access to data at a level of granularity dependent on the data type property of the buffer object.

9. The apparatus of claim 8, wherein the level of granularity includes one of pixel, block, line, or frame.

10. An apparatus comprising:
    a processor configured to execute instructions of a web application available from a web browser, the instructions including:
    instructions to configure a buffer object for use in a configurable pipeline to pass data within data channels between a plurality of executable software components in the configurable pipeline, the configurable pipeline created within the web browser and executed on a computing device, the buffer object comprising:
       a data type property;
       a data pointer identifying a location in a memory, the data pointer having an associated data size representing an amount of memory available at the memory location;
       an allocation method configured to allocate memory to the buffer object using the data pointer and the data size; and
       an accessor method configured to enable a component in the configurable pipeline to access data stored in the memory identified by the data pointer and the data size; and
    instructions to pass the buffer object through at least one of the data channels to the component when the data type property of the buffer object matches one or more specified data type properties usable by the component and to return the buffer object from the component after processing, the data type property indicative of a type of data stored in the memory identified by the data pointer and the data size.

11. The apparatus of claim 10, wherein the buffer object is configured to be accessible using JavaScript code that is exposed using a Document Object Model interface in the web browser.

12. The apparatus of claim 10, wherein the buffer object further comprises:
    a plurality of data type properties, each property representative of an aspect of the data stored in the memory identified by the data pointer and the data size.

13. The apparatus of claim 12, wherein the plurality of data type properties includes a property selected from the group of an audio sampling rate or a color of a video stream.

14. The apparatus of claim 10, wherein the data type property is one of: raw data, compressed stream, uncompressed stream, or generic.

15. The apparatus of claim 10, wherein the buffer object is used by a circular buffer technique in the configurable pipeline whereby data is stored in the buffer object by a first component, the buffer object is transferred to an input port of a second component via a data channel, the data is processed by the second component, and then the buffer object is returned to the first component to be reused.

16. The apparatus of claim 10, wherein the buffer object is used by a pass through technique in the configurable pipeline whereby data is stored in the buffer object by a first component, the buffer object is transferred to an input port of a second component via a data channel, the data is processed by the second component, and then the buffer object is used by the second component to output processed data to a third component.

17. A method, comprising:
- initializing, using a processor, a configurable pipeline based on instructions included within a web application executed by a web browser, the initialization including creating data channels between computer executable components in the configurable pipeline;
- creating a plurality of buffer objects to enable the data channels to transfer data between the components of the configurable pipeline, each buffer object including a data pointer identifying a location in a memory, the data pointer having an associated data size representing an amount of memory available at the memory location, and including a data type property indicative of a type of data stored in the memory identified by the data pointer and the data size;
- storing data in a buffer object of the plurality of buffer objects by an output port of a first component;
- passing the buffer object from the first component to an input port of a second component by way of at least one of the data channels responsive to the data type property of the buffer object matching one or more specified data type properties usable by the second component;
- retrieving the data stored in the buffer object by the second component for processing by the second component; and
- returning the buffer object through an output port of the second component via at least one of the data channels after processing.

18. The method of claim 17, wherein passing the buffer object from the first component to an input port of a second component by way of at least one of the data channels comprises:
- passing the buffer object through a first data channel to the web application executed by the web browser; and
- passing the buffer object through a second data channel to the second component from the web application.

19. The method of claim 17, wherein returning the buffer object comprises:
- returning the buffer object to the first component from the second component so that it can be reused by the first component.

* * * * *